United States Patent
Panje

(10) Patent No.: US 9,179,180 B2
(45) Date of Patent: Nov. 3, 2015

(54) METHOD AND APPARATUS FOR PROVIDING CUSTOMIZED INFORMATION

(75) Inventor: Krishna Prasad Panje, Bangalore (IN)

(73) Assignee: Google Technology Holdings LLC, Mountain View, CA (US)

( * ) Notice: Subject to any disclaimer, the term of this patent is extended or adjusted under 35 U.S.C. 154(b) by 421 days.

(21) Appl. No.: 12/391,296

(22) Filed: Feb. 24, 2009

(65) Prior Publication Data

US 2010/0131985 A1    May 27, 2010

(30) Foreign Application Priority Data

Nov. 26, 2008   (IN) .......................... 2678/DEL/2008

(51) Int. Cl.
| | |
|---|---|
| H04N 7/173 | (2011.01) |
| H04N 21/435 | (2011.01) |
| H04N 21/235 | (2011.01) |
| H04N 21/2362 | (2011.01) |
| H04N 21/41 | (2011.01) |
| H04N 21/433 | (2011.01) |
| H04N 21/434 | (2011.01) |
| H04N 21/4363 | (2011.01) |
| H04H 60/73 | (2008.01) |
| H04H 60/80 | (2008.01) |

(52) U.S. Cl.
CPC ........... *H04N 21/435* (2013.01); *H04N 21/235* (2013.01); *H04N 21/2362* (2013.01); *H04N 21/4122* (2013.01); *H04N 21/4126* (2013.01); *H04N 21/4334* (2013.01); *H04N 21/4345* (2013.01); *H04N 21/43637* (2013.01); *H04H 60/73* (2013.01); *H04H 60/80* (2013.01)

(58) Field of Classification Search
USPC ...................................................... 725/44–46
See application file for complete search history.

(56) References Cited

U.S. PATENT DOCUMENTS

| | | | | |
|---|---|---|---|---|
| 7,900,229 | B2 * | 3/2011 | Dureau | 725/46 |
| 2008/0004957 | A1 * | 1/2008 | Hildreth et al. | 705/14 |
| 2008/0281926 | A1 * | 11/2008 | Walter et al. | 709/206 |
| 2009/0222875 | A1 * | 9/2009 | Cheng et al. | 725/147 |

* cited by examiner

*Primary Examiner* — Hunter B Lonsberry
*Assistant Examiner* — Christine Kurien
(74) *Attorney, Agent, or Firm* — Fish & Richardson P.C.

(57) ABSTRACT

A method for providing customized information to a plurality of portable communication devices. A customer premises equipment (CPE) synchronizes with at least one of the plurality of portable communication devices. The CPE extracts descriptive data of media content stored in the at least one portable communication device. The CPE searches for a descriptive data of content available at the CPE based on the descriptive data extracted from the at least one portable communication device. The CPE determines that the extracted descriptive data matches the descriptive data of content available at the CPE. The CPE makes the content available to the at least one portable communication device.

15 Claims, 5 Drawing Sheets

METHOD AND APPARATUS FOR PROVIDING CUSTOMIZED INFORMATION

FIELD OF THE DISCLOSURE

The present invention relates in general to providing customized information, and more specifically to providing customized information to a portable communication device.

BACKGROUND

Viewers of television programming increasingly have more choices as to which programs to view. For example, cable television systems and digital satellite systems provide even more viewing choices. One effect of the increase in the number of viewing choices is increased difficulty in deciding which programs to watch. Viewers with busy schedules may not have the time to select and view programs to determine which programs they may or may not like. Programs that may otherwise be desirable to a viewer may never be watched if the program is broadcast at a time that is inconvenient for the viewer.

An attempt to inform users of various content or information among viewers is made using program guides (EPGs), reminders etc. Electronic program guides (hereafter "EPG") provides viewers with on-screen listings of upcoming television programs on cable television channels. However, this would require the viewer's presence in the television system's premises to select programs of interest for viewing or recording. Currently, portable communication devices such as Personal Digital Assistants (PDAs) and Mobile phones come with increased capabilities to store and render multimedia. Such devices enable a user to access, view, and store preferred content on-the-go. Further, in a typical home environment, different family members may have different interests. Accordingly, there is a need for a system and method for providing customized information to a portable communication device. There is a need for a system and method which would identify individual members and their preferences and provide an entertainment experience which is most pleasurable to the individual viewer.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
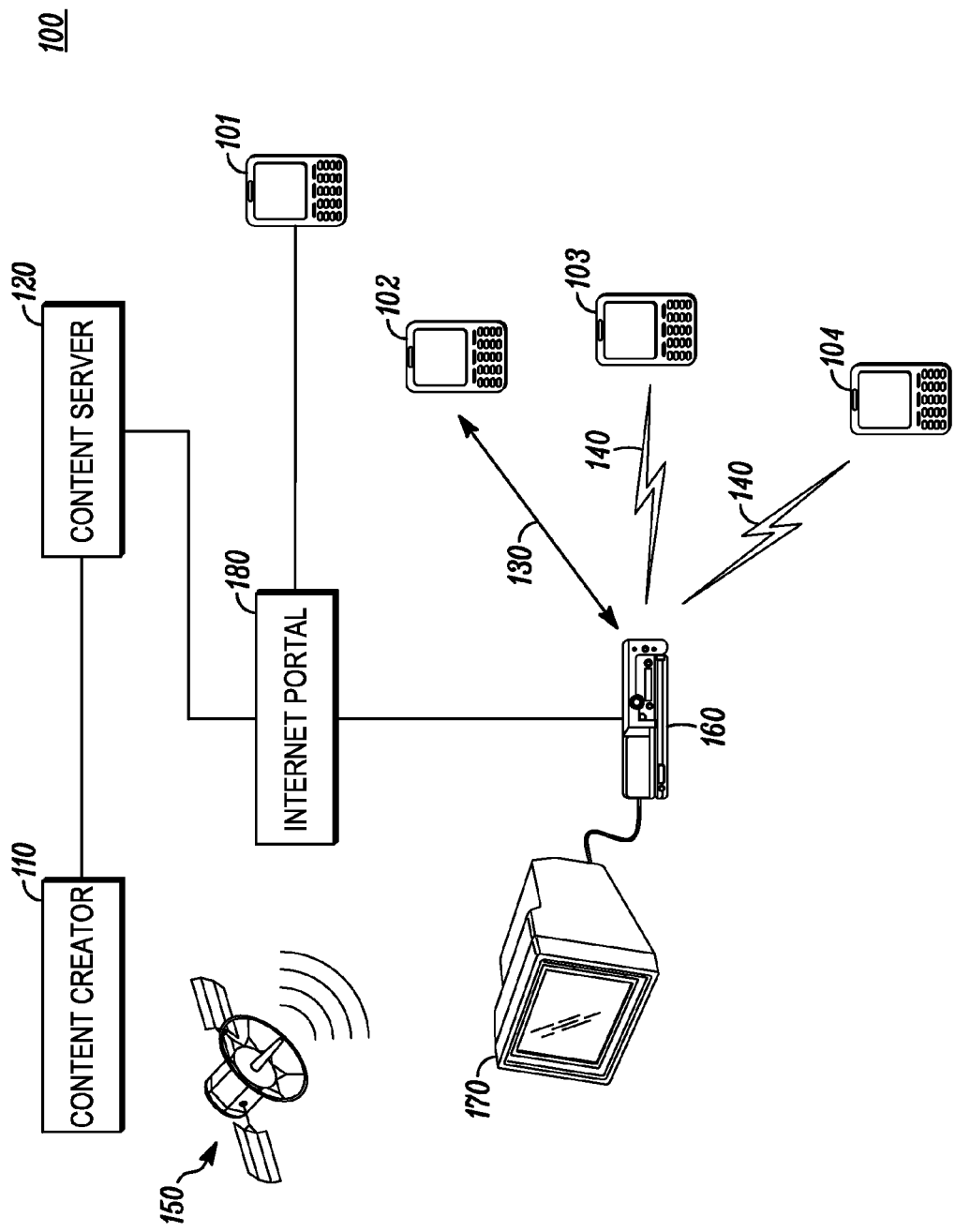
FIG. 1 is a block diagram illustrating a wireless communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Various embodiments of the invention disclose a method for providing customized information to a portable communication device. The portable communication device preferably synchronizes with a customer premises equipment (CPE). The CPE preferably extracts descriptive data of media content stored in the portable communication device and searches for a descriptive data of content available at the CPE. The CPE may determine weather the extracted descriptive data matches the descriptive data of content available at the CPE. The CPE may then provide the matched content to the portable communication device.

Before describing in detail the method for providing customized information to a portable communication device, it should be observed that the present invention resides primarily in combinations of method steps and apparatus components related to providing customized information to a portable communication device. Accordingly, the method steps have been represented where appropriate by conventional symbols in the drawings, showing only those specific details that are pertinent to understanding the present invention so as not to obscure the disclosure with details that will be readily apparent to those of ordinary skill in the art having the benefit of the description herein.

FIG. 1 is a block diagram illustrating a wireless communication system 100 for providing customized information in accordance with some embodiments. The wireless communication system 100 includes a content creator 110, a content server 120, a broadcast system 150, a customer premises equipment (CPE) 160, a content receiver 170, an internet portal 180, and portable communication devices 101, 102, 103, and 104. Each of the portable communication devices 101-104 is coupled to the CPE 160 through a wired connection 130 or a wireless connection 140 for transferring and receiving data from the CPE. In an example, the wired connection can be a universal serial bus (USB) connection and the wireless connection can be a Bluetooth or a WiFi connection.

The content creator 110 is a content production house or web portal which creates audio and video content. The broadcast system 150 broadcasts the created media content to the content receiver 170 e.g., television on an available channel. In an embodiment, the CPE 160 coupled to the television 170 is a set-top box (STB) located at a subscriber's premises and connected with an external source of signal such as a telecommunication channel. The content server 120 is used for providing the content to a portable communication device 101, 102, 103, or 104. The content server 120 used herein is a server which streams the content to the viewer. The content server 120 may be maintained by the cable service provider headend or by an internet entertainment portal. The internet portal 180 is used to send the media content to the portable communication devices 101-104. Internet portal used herein is a server on internet which facilitates ordering of content by a portable communication device 101, 102, 103, or 104.

In an example embodiment, the communication system includes a broadcast system, a CPE such as a set-top box coupled to a television, and one or more portable communication devices e.g. personal digital assistants (PDAs). The users of the PDAs are members of a same group and share the set-top box. Each of the members of the family can transmit and receive data from the set-top box. The members can also exchange data stored in their PDAs with each other. A user who is an action movie fan may store several Divx/MP4 compressed movies on his/her PDA's SD card or internal memory. Similarly a user who is a fan of a music band may have his/her favorite songs stored in his/her PDA. Also, the users access several media resources and store content using their PDAs, where such content is generally not available on a television channel. Sometimes the CPE might be receiving content suitable for the PDA. Further users bookmark their favorite media content on the PDA for quick access, the bookmarks and play lists indicate user interest.

Figure 2:
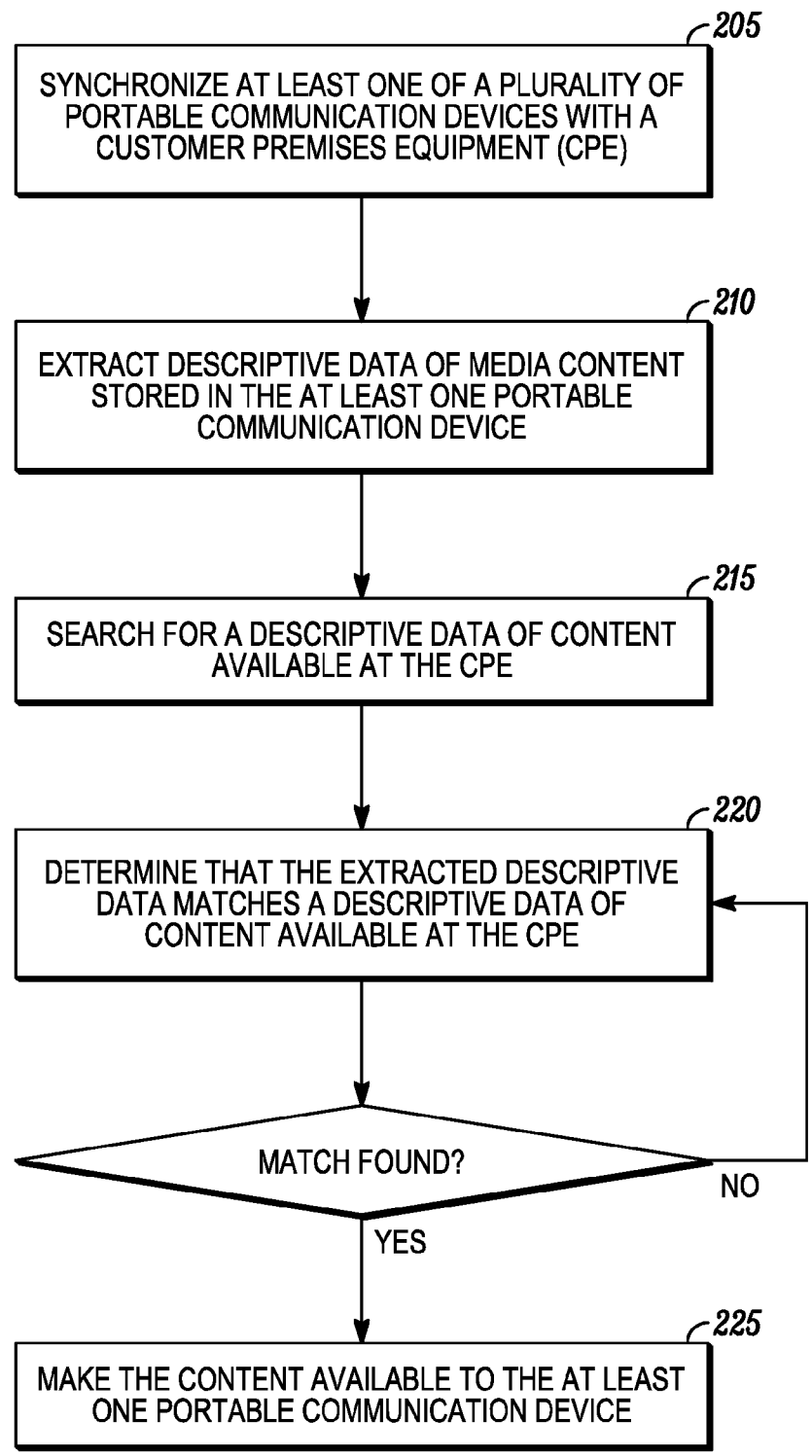
FIG. 2 is a flow chart illustrating a method of providing customized information in accordance with some embodiments.

As shown in FIG. 2, the CPE synchronizes with the at least one portable communication device at step 205. During synchronization, the portable communication device sends its identity to the CPE. The portable communication device's identity can be e.g., the device's serial number or international mobile subscriber identity (IMEI) number. The portable communication device synchronizes with the CPE through a wired connection e.g. universal serial bus (USB) port or a wireless connection e.g. Bluetooth or WiFi. At step 210, the CPE extracts descriptive data of the media content stored in the portable communication device. In an embodiment, the descriptive data includes metadata and keywords of the stored media content.

In an example embodiment, a user of the PDA might have set a bookmark for his favorite video clip in his PDA. Also, the user might be a fan of certain vocalists and have related media in his portable communication device's play-list. The CPE extracts metadata in the form of bookmarks and keywords from the portable communication device. A few other examples of metadata can be artist name and album. Also, ID3 tags can be extracted from the portable communication device to know the content type of the stored media content.

The CPE then stores the extracted descriptive data in its memory. The CPE maintains a unique folder in its memory for each portable communication device and stores the extracted descriptive data in the unique folder based on the identity of the portable communication device. At step 215, the software in the CPE may search a local storage, such as a DVR, for the descriptive data of the content or tunes to available broadcast channels for obtaining descriptive data of content being broadcast on the channels. In an embodiment, the CPE tunes to available channels in a round robin fashion or alternatively the CPE tunes to user specified programs/channels on available free tuners and extracts metadata by decoding data Packet IDs (PIDs) and CC. The PIDs and CC are object descriptors which describe the type of content. The content identified by these PIDs contain media attributes/keywords of the broadcasted content.

At step 220, the CPE determines whether the broadcasted content matches the preferences of the at least one portable communication device. The CPE compares the descriptive data of the broadcasted content with the descriptive data stored in the CPE for each of the at least one portable communication device. If a match is found, the CPE makes the matched content available to the at least one portable communication device at step 225. In an embodiment, the CPE sends a content clip or a full content to the portable communication device when the portable communication device synchronizes with the CPE.

In another embodiment, the CPE sends the content clip to the portable communication device through e.g., Bluetooth when the portable communication device is within communication range of the CPE. The CPE may also send the content clip or content description or electronic program guide (EPG) data to the portable communication device through SMS or MMS if the portable communication device is not within a communication range of the CPE. This is done by the CPE by sending a ContentID of the content and a time during which a keyword match was found to the content server. The content server then invokes a clip of the content that was delivered at that time. Alternatively, the CPE would send the content clip along with the identity of the portable communication device e.g. mobile number to the internet portal. The internet portal would then send the content clip to the portable communication device.

Upon receiving a request from the portable communication device for storing the entire content of the received content clip, the CPE stores the entire content in its memory. In an embodiment, the user of the portable communication device views the content clip on the portable communication device and places an order, if interested. The CPE may use an available tuner to record the content automatically at a time of broadcast, thereby allowing efficient usage of tuners.

In another embodiment, the portable communication device receives a clip of a show or a movie and it may order it as pay per view (PPV) or video on demand (VOD) content. Also, the portable communication device may inform the internet portal through SMS of a choice of program. The internet portal then places an order using a contentID of the desired content with the content server. The portable communication device can send a request to the CPE to download the matched content. In an embodiment, the portable communication device uses internet protocol (IP) for communicating with the CPE and content server. The portable communication device can then synchronize with the CPE to download the content onto the portable communication device. If no matched content is found on the CPE, the process moves to step 220 and is repeated.

In an example embodiment, a portable communication device synchronizes with the CPE. The CPE extracts a descriptive data of media content stored in the portable communication device. The extracted descriptive data includes the keywords "I Disappear", "James Blunt", "Jason", "borne identity", "submarine", "navy seal" "Steel stock" and "Metallica." The CPE tunes to available broadcast channels to determine the descriptive data of the broadcasted content. The descriptive data of the broadcasted content includes the following keywords: "James Blunt" on a music channel, "Steel stock" on a business channel program, and "I disappear" title track for an action movie say "MI-3." The CPE matches the descriptive data of the broadcasted content with the extracted descriptive data. The CPE finds a match for "James Blunt" on a music channel corresponding to a song, with vocalist as James Blunt stored in the portable communication device, a match for "steel stock" on a business channel program, and a match for "I Disappear" title track for an action movie say "MI-3." The CPE records an audio clip of James Blunt and a MP4 clip of "I Disappear" on movie "MI-3" on the CPE. The CPE then sends the recorded content to the portable communication device when the portable communication device synchronizes with the CPE or over Bluetooth or as a multimedia message (MMS).

Figure 3:
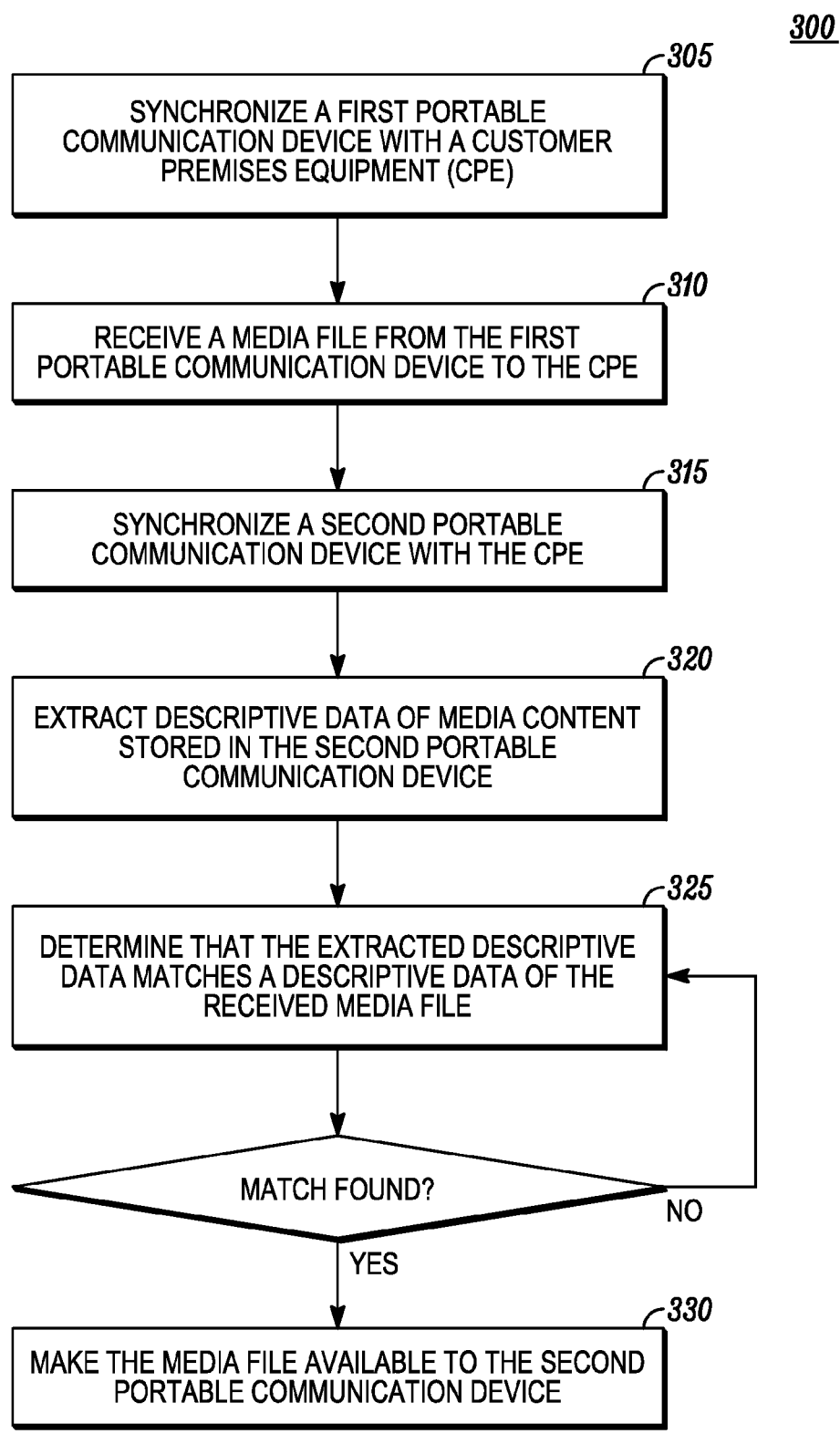
FIG. 3 is a flow chart illustrating a method of providing customized information in accordance with some embodiments.

FIG. 3 is a flow chart illustrating a method 300 of providing customized information in accordance with some embodiments. At step 305, the CPE synchronizes with a first portable communication device. The first portable communication device transfers media content stored in the portable communication device to the CPE at step 310. In an embodiment, the media content stored in the first portable communication device includes media files. At step 315, the CPE synchronizes with a second portable communication device. At step 320, the CPE extracts descriptive data of media content stored in the second portable communication device. In an embodiment, the descriptive data includes keywords and metadata of the media content stored in the portable communication device. The CPE determines that the descriptive data of the media files stored in the CPE matches the descriptive data extracted from the second portable communication device at step 325. If a match is found, the CPE makes the content available to the second portable communication device at step 330. If no matched content is found, the process moves to step 325 and is repeated.

In an example embodiment, a first portable communication device X synchronizes with the CPE. A user of the portable communication device X is a fan of "James Blunt." Therefore, the portable communication device X contains a video of a song having James Blunt as the vocalist. The portable communication device X transfers the video file to the CPE so that the user of the device X can view it on a large screen of a display unit connected to the CPE. A second portable communication device Y synchronizes with the CPE. The CPE extracts descriptive data of media content stored in the second portable communication device Y. A user of the portable communication device Y is also a fan of "James Blunt." Therefore, the portable communication device Y has a play list containing videos having James Blunt as vocalist. The CPE matches the descriptive data extracted from the portable communication device Y with the descriptive data of video file stored in the CPE. The CPE determines that the stored video file might be of interest to the user of the portable communication device Y and transfers the video file to the portable communication device Y.

Figure 4:
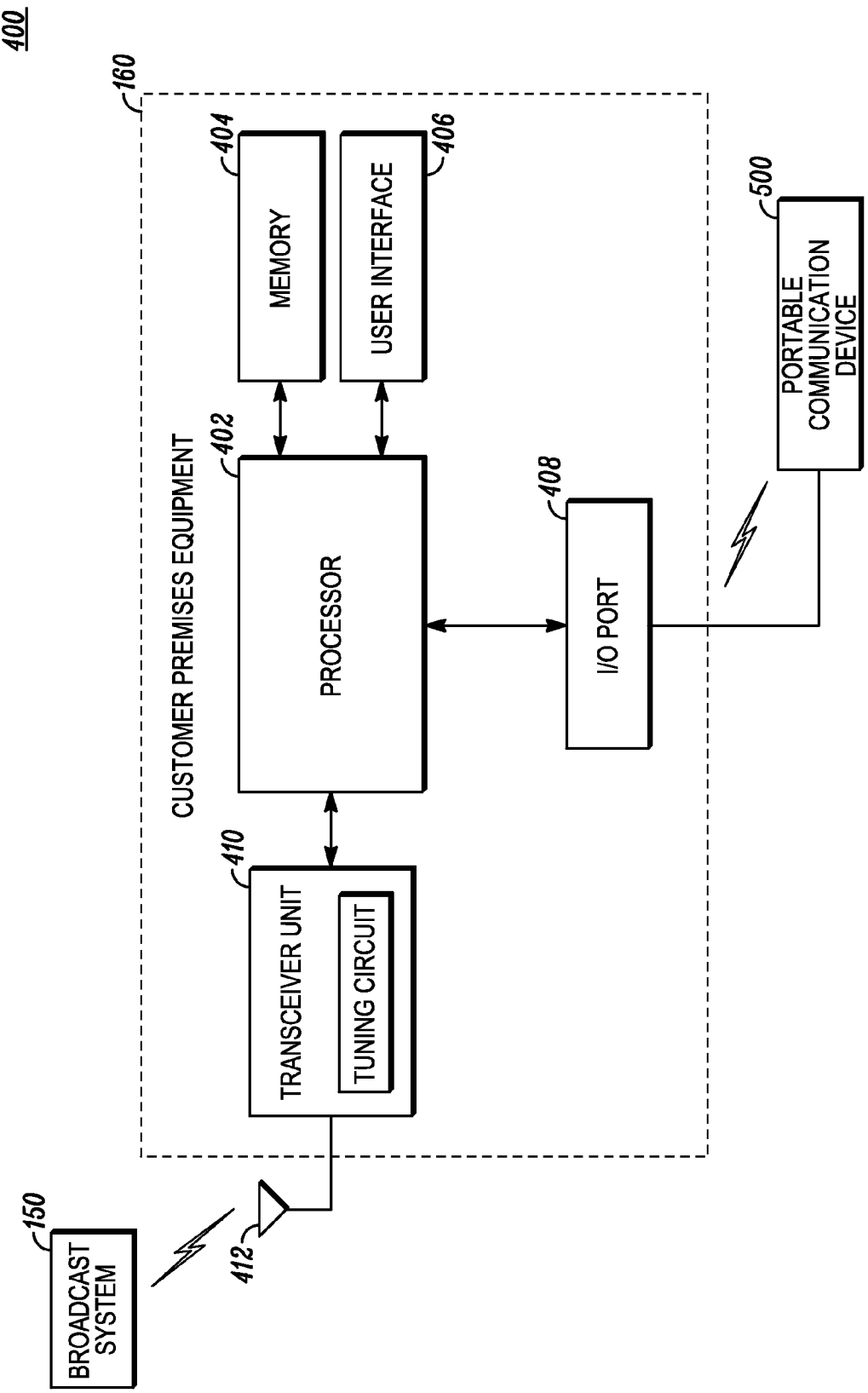
FIG. 4 is a block diagram of a customer premises equipment in accordance with some embodiments.

FIG. 4 is a block diagram 400 of a customer premises equipment (CPE) 160 in accordance with some embodiments. The CPE 160 comprises a processor 402, a memory 404, a user interface 406, an I/O port 408, and a transceiver unit 410 coupled to an antenna 412. The CPE 160 is an integrated unit containing at least all the elements depicted in FIG. 4, as well as any other elements necessary for the CPE 160 to perform its particular electronic function. Alternatively, the CPE 160 can comprise a collection of appropriately interconnected units or devices housed within the same physical unit 160, wherein such units or devices perform functions that are equivalent to the functions performed by the above-described elements of the CPE 160. The CPE 160 may be any type of wired or wireless device including, but not limited to a set-top box.

The processor 402 includes one or more microprocessors, microcontrollers, DSPs (digital signal processors), state machines, logic circuitry, or any other device or devices that process information based on operational or programming instructions. The processor 402 is configured for synchronizing the CPE 160 with at least one portable communication device 500 through the I/O port 408. In an embodiment, the CPE 160 synchronizes with the portable communication device 500 through a wired connection e.g. universal serial bus (USB) port or a wireless connection e.g. Bluetooth or WiFi. The processor 402 is further configured for extracting descriptive data of media content stored in the portable communication device 500. The processor 402 searches for descriptive data of content available at the CPE 160 and matches it with the extracted descriptive data.

In an embodiment, the processor 402 uses a tuning circuit present in the transceiver unit 410 for tuning to available broadcast channels to receive the content being broadcasted. In another embodiment, the processor 402 matches the extracted descriptive data with descriptive data of media files stored in the memory 404 of the CPE 160. The processor 402 stores the matched content in the memory 404. The memory 404 can be any form of non-volatile memory, such as a hard disk. The memory 404 is used for storing received information streams in accordance with some embodiments.

The transceiver 410 can be implemented as a transmitting and receiving component of a two-way wireless communication device. For a CPE, a transceiver can be implemented as part of the device hardware and software architecture in accordance with known techniques. In an embodiment, the functions of the transceiver can be implemented in the processor 402. The transceiver unit 410 is used for making the matched content available to the portable communication device 500 over the antenna 412. The antenna 412 includes any known or developed structure for radiating and receiving electromagnetic energy in the frequency range containing the wireless carrier frequencies.

Figure 5:
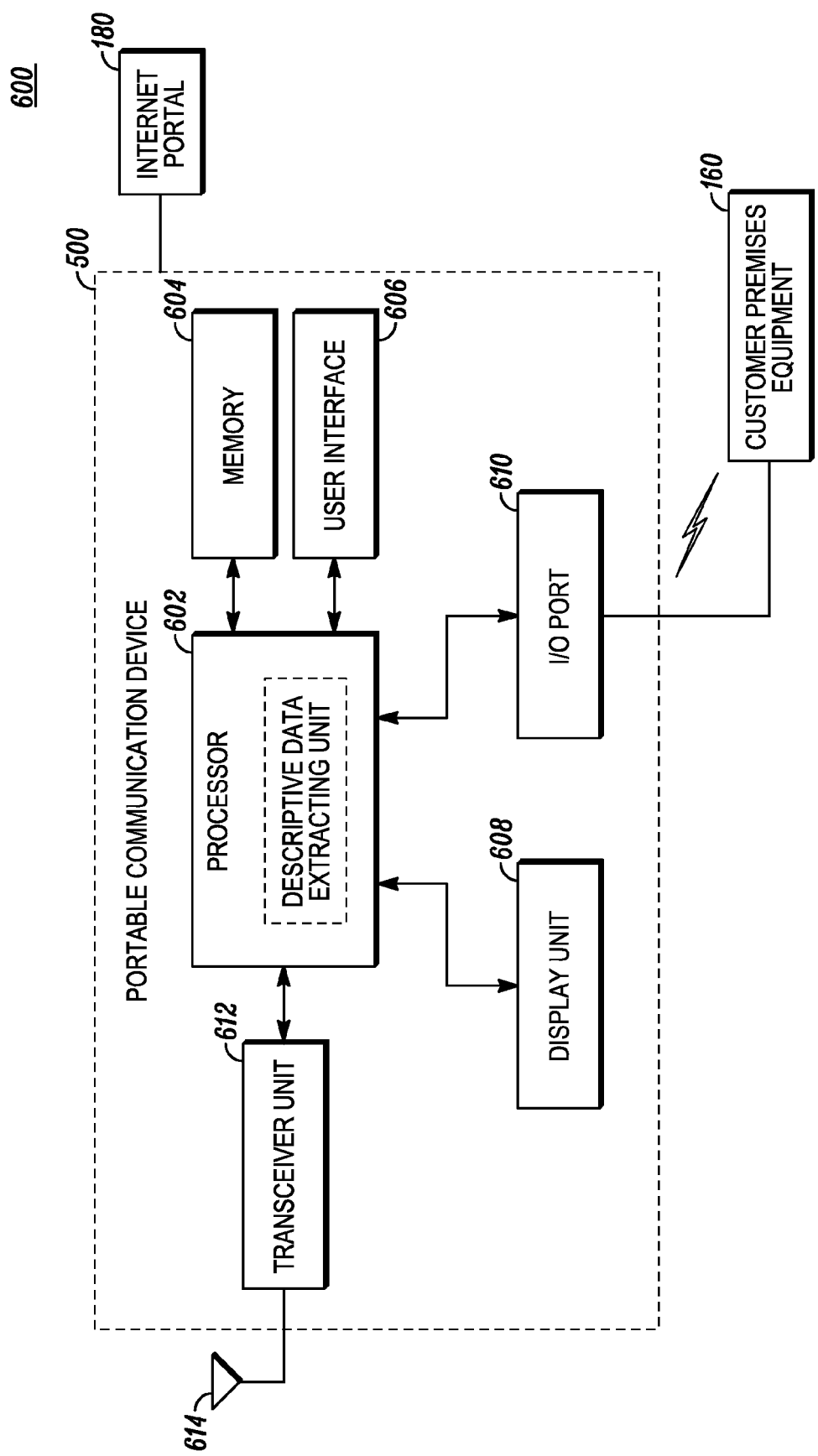
FIG. 5 is a block diagram of a portable communication device in accordance with some embodiments.

FIG. 5 is a block diagram 600 of a portable communication device 500 in accordance with some embodiments. The portable communication device 500 includes a processor 602, a memory 604, a user interface 606, a display unit 608, an I/O port 610 and a transceiver unit 612 coupled to an antenna 614. The portable communication device 500 is an integrated unit containing at least all the elements depicted in FIG. 5, as well as any other elements necessary for the portable communication device 500 to perform its particular electronic function. Alternatively, the portable communication device 500 can comprise a collection of appropriately interconnected units or devices housed within the same physical unit 500, wherein such units or devices perform functions that are equivalent to the functions performed by the above-described elements of the portable communication device 500. The portable communication device 500 may be any type of wireless communication device including, but not limited to, cellular, mobile, and wireless telephones and PDAs (personal digital assistants).

The processor 602 includes one or more microprocessors, microcontrollers, DSPs (digital signal processors), state machines, logic circuitry, or any other device or devices that process information based on operational or programming instructions. The memory 604 can be any form of non-volatile memory, such as a hard disk or a portable memory card. The memory 604 is used for storing received information streams in accordance with some embodiments. In an embodiment, the processor 602 includes an extracting unit for extracting descriptive data of media content stored in the portable communication device 500. The media content is stored in the memory 604 of the portable communication device 500. The user interface 606 comprises a keypad that allows a user of the portable communication device 500 to provide input to the portable communication device 500. In an embodiment, the user interface can also be a touch pad. The display unit 608 includes a display/screen for displaying the content stored in the portable communication device 500. The I/O port 610 is used for synchronizing the portable communication device 500 with the CPE 160. In an embodiment, the portable communication device 500 synchronizes with the CPE 160 through a wired connection e.g. universal serial bus (USB) port or a wireless such as Bluetooth or IEEE 802.11 based technology.

The transceiver 612 can be implemented as a transmitting and receiving component of a two-way wireless communication device. For a portable communication device, a transceiver can be implemented as part of the device hardware and software architecture in accordance with known techniques. In an embodiment, the functions of the transceiver 612 can be implemented in the processor 602. In the present embodiment, the transceiver unit 612 is used for transmitting and receiving data from the internet portal 180.

Regardless of the location of a user with respect to his content viewing source, the user gets an indication on his/her portable communication device if a content which is of interest to the user is being broadcasted. The CPE uses its background round robin search and tunes to available broadcast channels to access the content being broadcasted and provides information about the broadcasted content to the user on the user device. Further, the CPE only provides the content which is of interest to the user based on the information accessed from the user's portable communication device. Therefore, the user has the advantage of not having to manually tune to different channels or view the EPG to get information about the content being broadcasted on various channels. The user receives customized information to his portable communication device which saves time and effort on the user's part to access his/her favorite media content.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method for providing customized information to a portable communication device, the method comprising:
   receiving, from a portable communication device and by a customer premises equipment (CPE), an identifier of the portable communication device;
   extracting, by the CPE and from the portable communication device, metadata of media content stored in the portable communication device, wherein at least a portion of the media content stored in the portable communication device is not broadcast to the CPE;
   searching, by the CPE, for broadcast content that will be broadcast by a broadcaster based on the metadata extracted from the portable communication device;
   determining, by the CPE and based on the searching, that the extracted metadata matches descriptive data of broadcast content that will be broadcast by a broadcaster at a specified broadcast time;

recording, by the CPE and at the specified broadcast time, the broadcast content in response to determining that the broadcast content has descriptive data that matches the metadata; and providing, by the CPE, the recorded broadcast content to the portable communication device in response to the determination that the extracted metadata matches the descriptive data.

2. The method of claim 1, wherein media content stored at the CPE include media files received from at least one other portable communication device.

3. The method of claim 1, wherein the metadata of the media content includes keywords of the media content stored in the portable communication device.

4. The method of claim 1, further comprising storing the extracted metadata in a folder specific to the portable communication device based on the identifier of the portable communication device.

5. The method of claim 1, further comprising tuning, by the CPE, to available broadcast channels to determine descriptive data of content that is currently being broadcast to the CPE.

6. The method of claim 1, providing the recorded broadcast content comprises:
sending an indication of the recorded broadcast content to the portable communication device.

7. The method of claim 6, wherein sending an indication comprises:
sending a Short Message Service (SMS) containing a content description of the recorded broadcast content to the portable communication device.

8. The method of claim 1, wherein providing the recorded broadcast content comprises:
sending a clip of the matched broadcast content to the portable communication device.

9. The method of claim 1, further comprising downloading the recorded broadcast content to the portable communication device in response to receiving an input from the portable communication device.

10. An apparatus for providing customized information to a portable communication device, the apparatus comprising:
a processor configured for receiving, by a customer premises equipment (CPE) and through an I/O port, an identifier of the portable communication device, wherein the processor is further configured for:
extracting, by the CPE and from the portable communication device, metadata of media content stored in the portable communication device, wherein at least a portion of the media content stored in the portable communication device is not broadcast to the CPE;
searching, by the CPE, for broadcast content that will be broadcast by a broadcaster based on the metadata extracted from the portable communication device;
determining, by the CPE and based on the searching, that the extracted metadata matches descriptive data of broadcast content that will be broadcast by a broadcaster at a specified broadcast time;
recording, by the CPE and at the specified broadcast time, the broadcast content in response to determining that the broadcast content has descriptive data that matches the metadata; and
a transceiver unit coupled to the processor for providing the recorded broadcast content to the portable communication device in response to the determination that the extracted metadata matches the descriptive data.

11. The apparatus of claim 10, wherein the portable communication device is a Personal Digital Assistant (PDA).

12. The apparatus of claim 10, wherein the I/0 port is at least one of a universal serial bus (USB) port, wifi, or bluetooth.

13. The apparatus of claim 10, further comprising a tuning circuit for tuning to available broadcast channels to determine descriptive data of content that is currently being broadcast to the CPE.

14. The method of claim 1, further comprising:
determining a free tuner in a plurality of tuners on the CPE; and
using the free tuner to tune to broadcast channels to determine descriptive data of content that is currently being broadcast to the CPE.

15. The method of claim 1, wherein searching comprises searching local storage of the CPE for the descriptive data of broadcast content.

* * * * *